United States Patent
Kim et al.

(10) Patent No.: US 10,701,704 B2
(45) Date of Patent: *Jun. 30, 2020

(54) APPARATUS AND METHOD OF RESOURCE ALLOCATION FOR DATA AND CONTROL CHANNELS IN A WIRELESS COMMUNICATION SYSTEM

(71) Applicant: Samsung Electronics Co., Ltd., Gyeonggi-do (KR)

(72) Inventors: Youngbum Kim, Seoul (KR); Cheng Shan, Gyeonggi-do (KR); Younsun Kim, Gyeonggi-do (KR); Bruno Clerckx, London (GB)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/286,001

(22) Filed: Feb. 26, 2019

(65) Prior Publication Data

US 2019/0191438 A1 Jun. 20, 2019

Related U.S. Application Data

(63) Continuation of application No. 13/459,907, filed on Apr. 30, 2012, now Pat. No. 10,219,282.
(Continued)

(51) Int. Cl.
*H04W 72/08* (2009.01)
*H04L 5/00* (2006.01)
*H04W 72/04* (2009.01)

(52) U.S. Cl.
CPC ........... *H04W 72/08* (2013.01); *H04L 5/0053* (2013.01); *H04W 72/042* (2013.01); *H04L 5/0094* (2013.01); *H04W 72/048* (2013.01)

(58) Field of Classification Search
CPC ... H04L 5/0053; H04L 5/0094; H04L 72/042; H04W 72/048
See application file for complete search history.

(56) References Cited

U.S. PATENT DOCUMENTS 8,009,623 B2 8/2011 Higuchi et al.
2010/0142461 A1 6/2010 Miki et al.
(Continued)

FOREIGN PATENT DOCUMENTS

EP 2 129 159 12/2009
KR 10-1026349 4/2011
(Continued)

OTHER PUBLICATIONS

3rd Generation Partnership Project; Technical Specification Group Radio Access Network; Evolved Universal Terrestrial Radio Access (E-UTRA); Physical Layer Procedures (Release 10), 3GPP TS 36.213 V10.1.0, Mar. 2011.
(Continued)

*Primary Examiner* — Marcus Smith
(74) *Attorney, Agent, or Firm* — The Farrell Law Firm, P.C.

(57) ABSTRACT

A method and system for resource allocation is provided. A method includes identifying bit map information on a set of resource blocks associated with a control channel for a UE, through radio resource control (RRC) signaling from a base station; receiving, from the base station, control information for downlink data on the control channel identified based on the bit map information; and receiving, from the base station, the downlink data on a data channel based on the control information. The control information is received on at least one control channel resource, which is included in the set of resource blocks. A search space for the control channel of the UE is defined based on an aggregation level, a number of the at least one control channel resource
(Continued)

included in the set of resource blocks, and a number of a candidate associated with the control channel.

20 Claims, 9 Drawing Sheets

Related U.S. Application Data (60) Provisional application No. 61/480,809, filed on Apr. 29, 2011.

(56) References Cited

U.S. PATENT DOCUMENTS

| | | | |
|---|---|---|---|
| 2011/0110296 A1 | 5/2011 | Malladi et al. | |
| 2011/0170496 A1 | 7/2011 | Fong | |
| 2011/0222491 A1 | 9/2011 | Vajapeyam | |
| 2012/0106465 A1 | 5/2012 | Haghighat et al. | |
| 2012/0155561 A1* | 6/2012 | Seo | H04B 7/15542 375/260 |
| 2012/0207082 A1 | 8/2012 | Liu et al. | |
| 2012/0250551 A1 | 10/2012 | Sartori et al. | |
| 2012/0327842 A1* | 12/2012 | Shen | H04L 5/0053 370/315 |
| 2013/0230015 A1 | 9/2013 | Hoymann et al. | |
| 2013/0265934 A1* | 10/2013 | Zeng | H04B 7/15528 370/315 |

FOREIGN PATENT DOCUMENTS

| | | |
|---|---|---|
| WO | WO 2010/061717 | 6/2010 |
| WO | WO 2010/129605 | 11/2010 |
| WO | WO 2011/005787 | 1/2011 |
| WO | WO 2012/065727 | 5/2012 |

OTHER PUBLICATIONS

European Search Report dated Oct. 9, 2014 issued in counterpart application No. 12776463.7-1857.

European Search Report dated Sep. 20, 2017 issued in counterpart application No. 12776463.7-1857, 6 pages.

* cited by examiner

FIG. 3A eNB Procedures

FIG. 3B

User Procedures

User Procedures

APPARATUS AND METHOD OF RESOURCE ALLOCATION FOR DATA AND CONTROL CHANNELS IN A WIRELESS COMMUNICATION SYSTEM

PRIORITY

The present application is a Continuation of U.S. application Ser. No. 13/459,907, which was filed in the U.S. Patent and Trademark Office on Apr. 30, 2012, issued as U.S. Pat. No. 10,219,282 on Feb. 26, 2019, and claims priority under 35 U.S.C. § 119(e) to U.S. Provisional Application No. 61/480,809, which was filed in the United States Patent and Trademark Office on Apr. 29, 2011, the entire disclosure of which is incorporated herein by reference.

BACKGROUND OF THE INVENTION

1. Field of the Invention

The present invention relates generally to a wireless cellular communication system, and more particularly, to an Orthogonal Frequency Division Multiple Access (OFDMA) wireless communication system, wherein control and data channels for a particular User Equipment (UE) are time-division multiplexed.

2. Description of the Related Art

In 3rd Generation Partnership Project Long Term Evolution (3GPP LTE) Release 8, i.e., a legacy system, a Physical Downlink Control CHannel (PDCCH) is presented in several initial Orthogonal Frequency Division Multiplexing (OFDM) symbols. The number of OFDM symbols used for the PDCCH is indicated in a Physical Control Format Indication CHannel (PCFICH) in a first OFDM symbol. Each PDCCH includes L Control Channel Elements (CCEs), where L=1, 2, 4, or 8, representing different CCE aggregation levels. Each CCE includes 9 Resource Element Group (REG) spreading on the transmission bandwidth.

Upon receiving the PDCCH, the UE blindly attempts decoding the PDCCH on its search space. The search space contains multiple possible CCE starting indexes and CCE aggregation levels. The UE attempts to decode an expected Downlink Control Information (DCI) format based in this assumption. If a Cyclic Redundancy Check (CRC) passes, the UE assumes a DCI format is successfully received. In legacy 3GPP systems, e.g., 3GPP LTE Releases 8-10, the PDCCH is transmitted using transmit diversity when multiple antennas are available, and the UE uses common reference signals inside the PDCCH region for decoding. The common reference signals are cell-specific.

SUMMARY OF THE INVENTION

An aspect of the present invention is to provide an apparatus and methods for a wireless system to schedule both control and data channel within the same bandwidth, wherein resource blocks in the frequency domain are assigned to a UE, and the assigned resource blocks are selected such that the UE will have better channel gain on those selected resource blocks.

Another aspect of the present invention is to impose a constraint on resource scheduling for both control and data channels, such that a resource allocated to a data channel must be overlapped by at least resource block used by a control channel.

By introducing such resource allocation constraints to the system, the number of information bits needed to be carried by the DCI can be reduced, reducing system overhead and improving system performance.

In accordance with an aspect of the present invention, a method is provided for a user equipment (UE) in a wireless communication system. The method includes identifying bit map information on a set of resource blocks associated with a control channel for the UE, through radio resource control (RRC) signaling from a base station; receiving, from the base station, control information for downlink data on the control channel identified based on the bit map information; and receiving, from the base station, the downlink data on a data channel based on the control information. The control information is received on at least one control channel resource, the at least one control channel resource being included in the set of resource blocks. A search space for the control channel of the UE is defined based on an aggregation level, a number of the at least one control channel resource included in the set of resource blocks, and a number of a candidate associated with the control channel.

In with accordance another aspect of the present invention, a method is provided for a base station in a wireless communication system. The method includes identifying bit map information on a set of resource blocks associated with a control channel for a UE; transmitting, to the UE, the bit map information on RRC signaling; transmitting, to the UE, control information for downlink data on the control channel identified based on the bit map information; and transmitting, to the UE, the downlink data on a data channel based on the control information. The control information is transmitted on at least one control channel resource, the at least one control channel resource being included in the set of resource blocks. A search space for the control channel of the UE is defined based on an aggregation level, a number of the at least one control channel resource in the set of resource blocks, and a number of a candidate associated with the control channel.

In accordance with another aspect of the present invention, a UE is provided for use in a wireless communication system. The UE includes a transceiver; and a controller coupled with the transceiver and configured to identify bit map information on a set of resource blocks associated with a control channel for the UE, through RRC signaling from a base station; control the transceiver to receive, from the base station, control information for downlink data on the control channel identified based on the bit map information; and control the transceiver to receive, from the base station, the downlink data on a data channel based on the control information. The control information is received on at least one control channel resource, the at least one control channel resource being included in the set of resource blocks. A search space for the control channel of the UE is defined based on an aggregation level, a number of the at least one control channel resource included in the set of resource blocks, and a number of a candidate associated with the control channel.

In accordance with another aspect of the present invention, a base station is provided for use in a wireless communication system. The base station includes a transceiver; and a controller coupled with the transceiver and configured to identify bit map information on a set of resource blocks associated with a control channel for a UE; control the transceiver to transmit, to the UE, the bit map information on RRC signaling; control the transceiver to transmit, to the UE, control information for downlink data on the control channel identified based on the bit map information; and control the transceiver to transmit, to the UE, the downlink data on a data channel based on the control information. The control information is transmitted on at least one control channel resource, the at least one control channel resource being included in the set of resource blocks. A search space for the control channel of the UE is defined based on an aggregation level, a number of the at least one control channel resource in the set of resource blocks, and a number of a candidate associated with the control channel.

In accordance with another aspect of the present invention, a method is provided for a UE in a wireless communication system. The method includes identifying information for a subband, through RRC signaling from a base station, wherein a set of resource blocks (RBs) is included in the subband; receiving, from the base station, control information for downlink data on a control channel identified based on the information for the subband, wherein at least one RB in the subband is indicated for the downlink data by the control information; and receiving, from the base station, the downlink data on a data channel based on the at least one RB. The control information is received on at least one control channel resource, the at least one control channel resource being included in the set of RBs. A search space for the control channel of the UE is defined based on an aggregation level, a number of the at least one control channel resource included in the set of RBs, and a number of a candidate associated with the control channel.

In accordance with another aspect of the present invention, a method is provided for a base station in a wireless communication system. The method includes identifying information for a subband, wherein a set of RBs is included in the subband; transmitting, to the UE, the information for the subband on RRC signaling; transmitting, to the UE, control information for downlink data on a control channel identified based on the information for the subband, wherein at least one RB in the subband is indicated for the downlink data by the control information; and transmitting, to the UE, the downlink data on a data channel based on the at least one RB. The control information is transmitted on at least one control channel resource, the at least one control channel resource being included in the set of RBs. A search space for the control channel of the UE is defined based on an aggregation level, a number of the at least one control channel resource included in the set of RBs, and a number of a candidate associated with the control channel.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In an evolutionary system based on LTE Release 10, such as Release 11 and beyond, the PDCCH might be further extended into the legacy data channel region. For example, a system can either assign one or a few OFDM symbols, e.g., a next one or two OFDM symbols following the legacy PDCCH symbols in a subframe, or assign a sub-set of Resource Blocks (RBs) for extended PDCCH.

Figure 1:
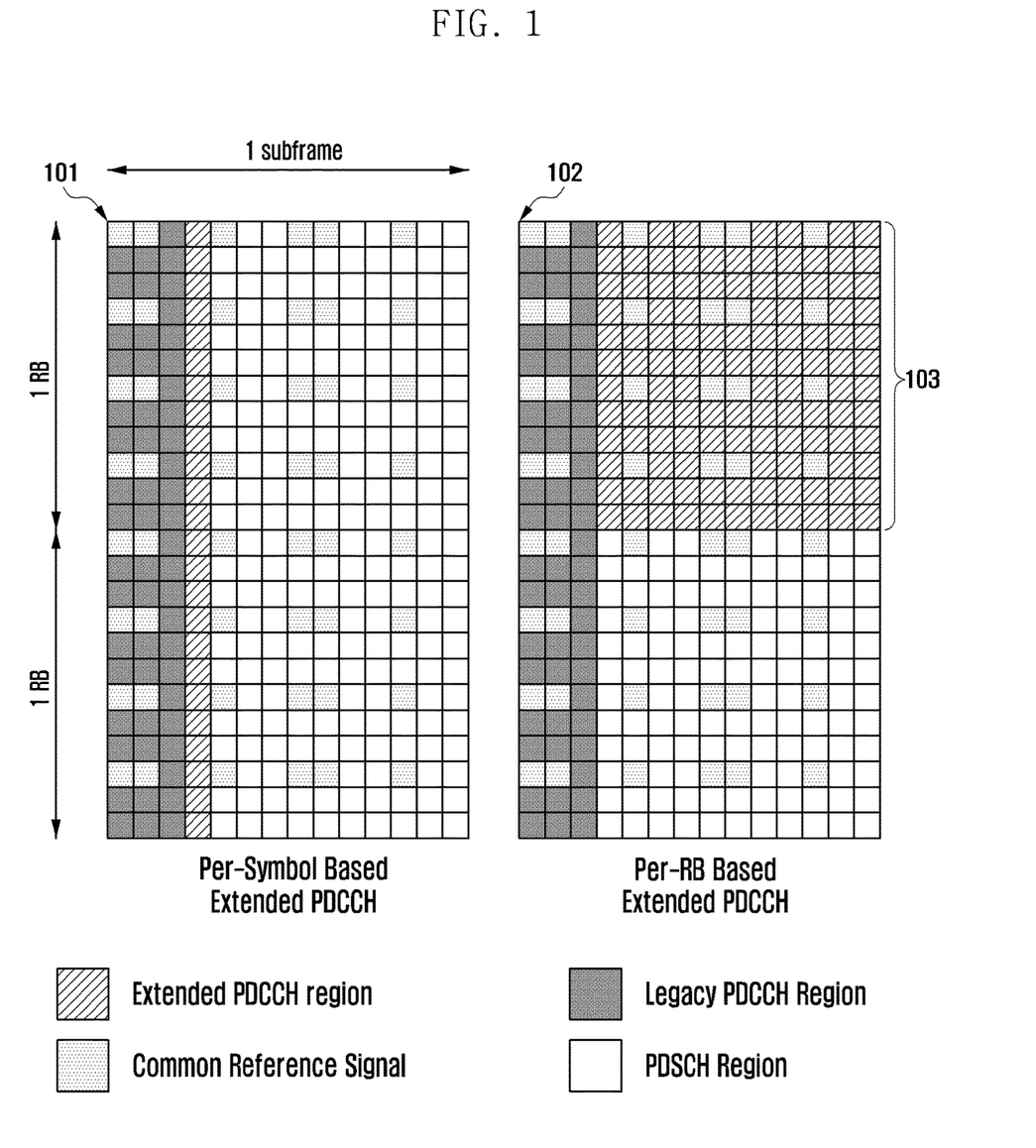
FIG. 1 illustrates two examples of a subframe including extended PDCCH regions according to an embodiment of the present invention.

FIG. 1 illustrates two examples of a subframe including extended PDCCH regions.

Referring to FIG. 1, in subframes 101 and 102, each of the symbols to the right of those indicated as being within the legacy PDCCH region, except those indicated as common reference signals, can be considered as being part of the legacy data channel region. In subframe 101, the PDCCH is extended into the legacy data channel region, by assigning a next symbol following the symbols of the legacy PDCCH region as an extended PDCCH region. Further, in subframe 102, the PDCCH is extended into the legacy data channel region, by assigning all of the symbols of the legacy data channel region in RB 103 as an extended PDCCH region.

For the extended PDCCH, because it can be either locally or distributed located in the frequency domain, a system can exploit multi-user gain by scheduling preferable subbands with better channel gain to respective users. In general, several key objectives have been proposed for the extended PDCCH. First, the resources available for the PDCCH are extended, in particular for carrier aggregation as well as for other features that also increase the required resources for the PDCCH, such as Multiple User Multiple Input/Multiple Output (MU-MIMO). Second, interference mitigation of the PDCCH for heterogeneous networks might be performed as the extended PDCCH is defined in the PDSCH region, and therefore RB-based interference management and coordination can be performed.

Common Resource Restriction for both Extended Control Channel and Data Channels

In a wireless OFDM system according to an embodiment of the present invention, a subset of RBs included in the full bandwidth are selected for a particular UE. The subset may be different from UE to UE, and the size of the subset, i.e., the number of RBs included in the subset, may vary.

More specifically, a base station (or eNB) determines whether or not resource restriction should be applied to a UE and selects RBs for the UE based on information and feedback of the UE, e.g., channel information on a subband, expected traffic for the UE, channel status feedback information, etc. When the resource restriction decision is made, the eNB sends a configuration message to the UE, informing the UE of its assigned control and data channels. For example, the configuration message can be transmitted via high layer Radio Resource Control (RRC) message, hereinafter referred to as an RRC resource restriction message. Further, the RB sub-set configuration may be semi-statically configured, i.e., once configured, it is not to be expected to be re-configured for a certain period of time, e.g., several radio frames.

After the UE is allocated with the RB sub-set restriction, it assumes all control and data payload will be transmitted using the allocated RBs. Basically, the UE assumes the allocated subset of RBs as a virtual system bandwidth, and the resource partitioning and assignment will be done based on this assumption.

Because the size of the virtual system bandwidth is reduced as indicated by the configuration message, the bits used for resource allocation can be accordingly reduced.

For a system bandwidth with $N_{RB}$ RBs, out of which $N_{RB}^{Suset,u}$ RBs are allocated to a UE u, the RRC configuration can be an $N_{RB}$-bit bitmap indicated, if each RB is allocated for the UE. In 3GPP, the number of bits used for resource allocation is shown below.

Resource Allocation Type 0&1: $\lceil N_{RB}/P \rceil$
Resource Allocation Type 2: $\lceil \log_2(N_{RB}(N_{RB}+1)/2) \rceil$ With a resource restriction method in accordance with an embodiment of the present invention, the number of bits used for resource allocation within an RB subset is reduced as shown below.

Resource Allocation Type 0&1: $\lceil N_{RB}^{Subset,u}/P \rceil$
Resource Allocation Type 2: $\lceil \log_2(N_{RB}^{Subset,u}(N_{RB}^{Subset,u}+1)/2) \rceil$ Because a new DCI format size with the resource restriction method will be variable and user-specific, restrictions should be imposed on the value of $N_{RB}^{Subset,u}$, such that it does not conflict with other DCIs format sizes. The restricted values of $N_{RB}^{Subset,u}$ will depend on the system bandwidth.

Figure 2:
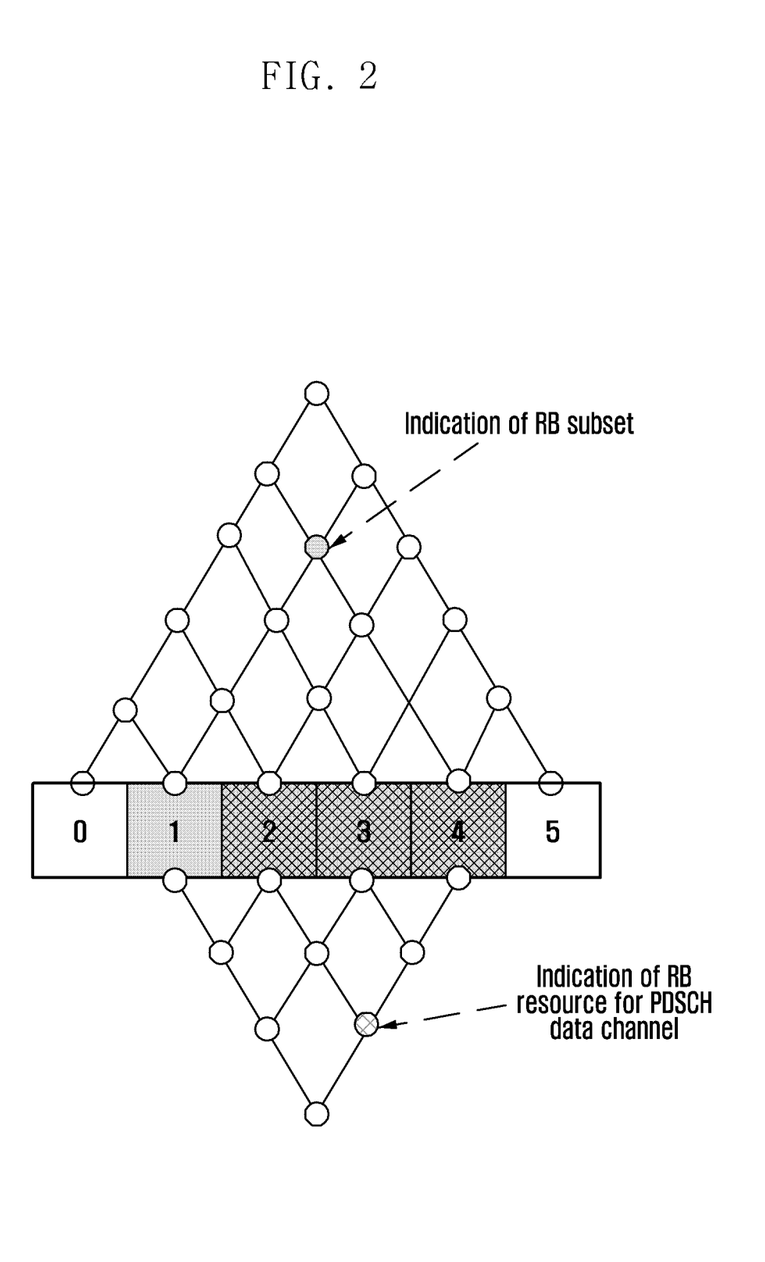
FIG. 2 illustrates resource allocation restriction for a PDCCH and a Physical Downlink Shared CHannel (PDSCH) according to an embodiment of the present invention.

FIG. 2 illustrates resource allocation restriction for a PDCCH and PDSCH according to an embodiment of the present invention. Specifically, FIG. 2 illustrates an example of type 2 resource allocation, where a 6-RB system is presented.

Referring to FIG. 2, the RRC resource restriction message indicates that RBs 1-4 are allocated as the RB subset for UE u, and a field for indicating the PDSCH data resource in a DCI format assigns RBs 2-4 for PDSCH transmission. In this example, 1 bit (RB 1) is saved for DCI format for downlink allocation. The savings will be more significant if the system bandwidth increases and the subset size decreases.

Figure 3A:
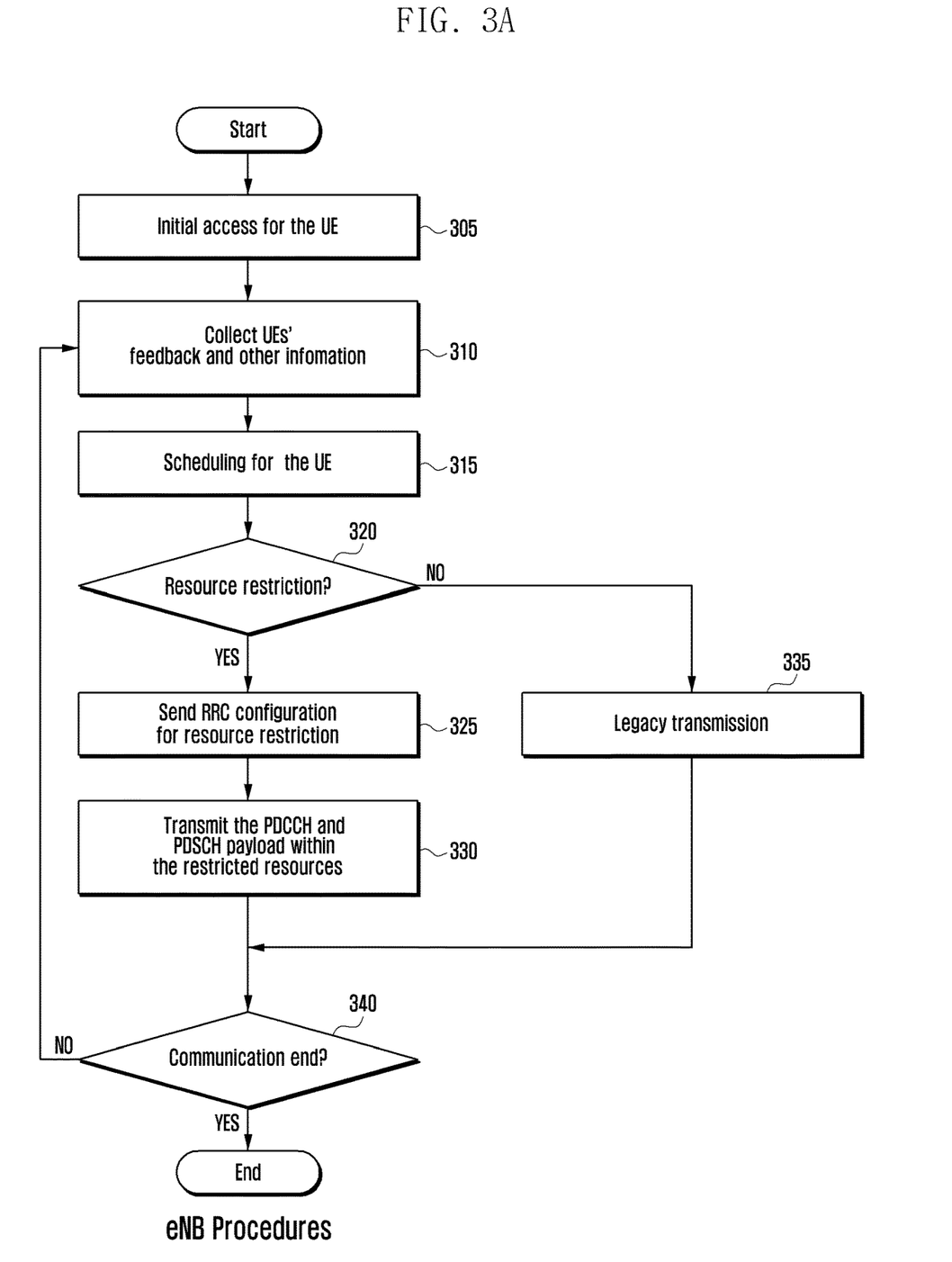
FIG. 3A is a flowchart illustrating an evolved Node B (eNB) method of resource allocation restriction according to an embodiment of the present invention.

FIG. 3A is a flowchart illustrating an evolved Node B (eNB) method of resource allocation restriction according to an embodiment of the present invention.

Referring to FIG. 3A, the eNB performs initial access for a UE in step 305. For example, the eNB and UE can set up communication as defined in the legacy systems.

In step 310, the eNB collects UEs feedback and other information. For example, the other information may include at least one of channel information on a subband, expected traffic of the UE, and channel status feedback information.

Based on the collected information, the eNB performs scheduling for the UE in step 315, and determines whether or not resource restriction should be applied to the UE in step 320.

When resource restriction is applied (or modified from a previous restriction), the eNB send a message, i.e., an RRC resource restriction message, to the UE to activate (or update) the resource restriction in step 325. For example, the RRC resource restriction message can be a bitmap indicating which RBs or which predefined subbands are allocated to the UE. The RRC resource restriction message can also take a compressed version for RB indication, e.g., the tree structure indication illustrated in FIG. 2, where each node indicates all the branches under it.

In step 330, the eNB transmits PDCCH and PDSCH payload to the UE using the restricted resources.

When resource restriction is not applied in step 320, legacy operations are performed without sending any configuration to the UE in step 335. Alternatively, in step 335, the eNB can indicate all of the RBs or subbands included in the system bandwidth, such that no resource restriction is applied.

In step 340, the eNB determines whether communication between the eNB and the UE is finished. When the communication is not finished, the method returns to step 310, where the eNB collects the UE feedback and other information. When the communication is finished, the method ends.

Figure 3B:
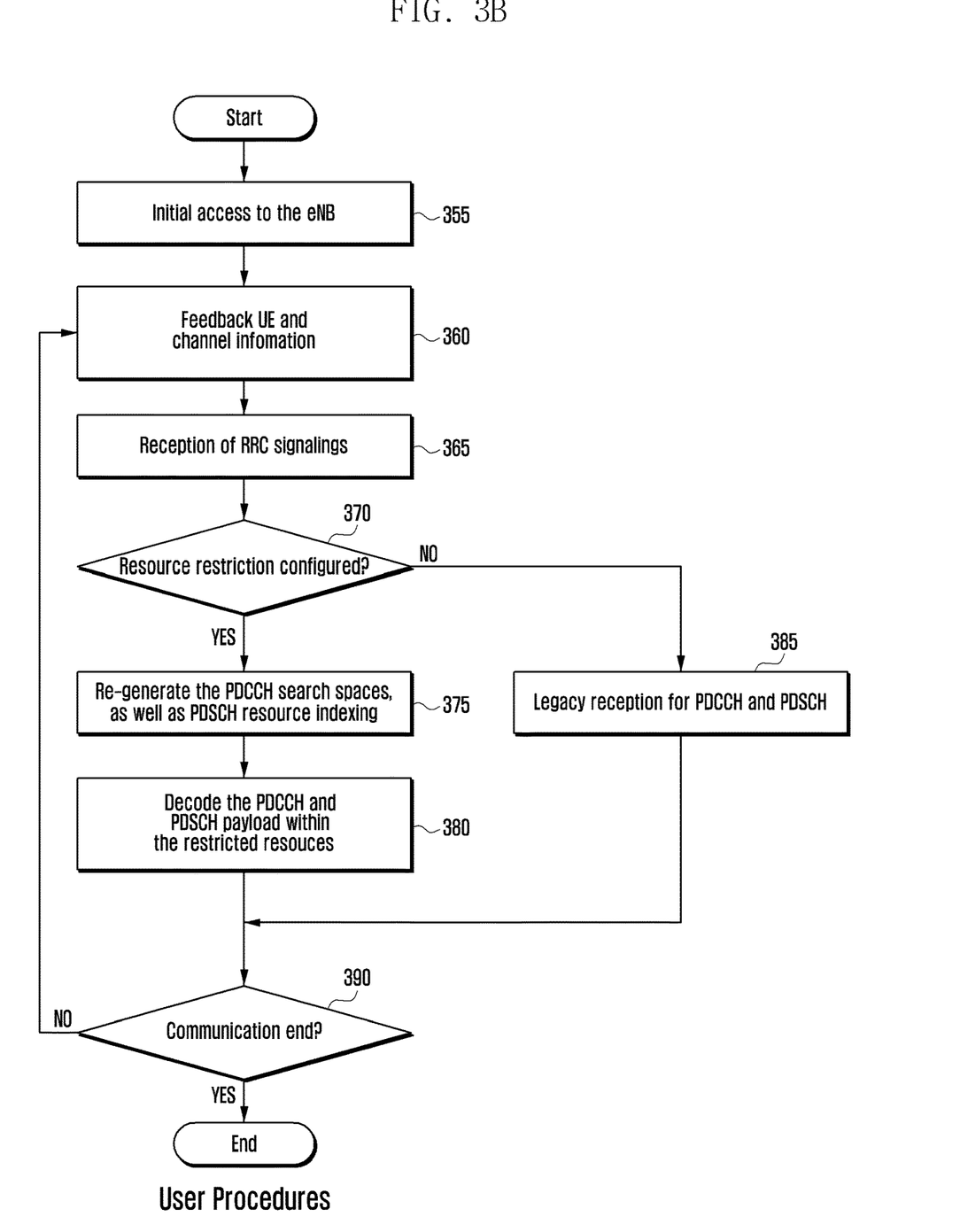
FIG. 3B is a flowchart illustrating a UE method of resource allocation restriction according to an embodiment of the present invention.

FIG. 3B is a flowchart illustrating a UE method of resource allocation restriction according to an embodiment of the present invention.

Referring to FIG. 3B, the UE performs initial access for the eNB in step 355. For example, the UE and the eNB can set up communication as defined in the legacy systems.

In step 360, the UE transmits feedback and other information to the eNB. As described above, the other information may include channel information on a subband, expected traffic of the UE, channel status feedback information, etc.

In step 365, the UE receives a message from the eNB. The message may be an RRC resource restriction message, such as a bitmap indicating which RBs or which predefined subbands are allocated to the UE.

In step 370, the UE decode the message and determine whether or not resource restriction is applied to the UE.

When the UE receives the RRC resource restriction message, the UE re-indexes its available RBs and re-partitions resources for potential extended PDCCH usage based on the RRC resource restriction message in step 375.

In step 380, the UE decodes PDCCH and PDSCH payload received within the restricted resources. More specifically, the eNB sends both the control and data channels to the UE, as scheduled by the RRC resource restriction message. The UE first tries extended PDCCH blind decoding on the modified search spaces, which are restricted in the RB subset. Because the PDSCH data channel transmission will also be restricted within the RB subset, the size of related DCI format will also be changed. The UE also takes this into account when doing the control channel blind decoding. After decoding the extended PDCCH, the UE locates its assigned PDSCH resource within the RB subset, and then decodes the data carried therein.

When the UE does not receive an RRC resource restriction message in step 370, legacy reception for PDCCH and PDSCH is performed in step 385. Alternatively, the UR could receive an indication that all of the RBs or subbands of the system bandwidth are available, so that no resource restriction is applied.

In step 390, the UE determines whether communication between the UE and the eNB is finished. If the communication is not finished, the method returns to step 360; otherwise, the method is ended.

Common Resource Mandating for Control and Data Channel

In accordance with another embodiment of the present invention, a system can mandate common resources for both control and data channels, such that the resources for the two channels can be bonded in frequency domain, and the resource allocation indication field size can be reduced accordingly. For example, the resource block of control channel and the resource block of data channel have at least one resource block in common.

There are multiple alternatives for defining a common resource. For example, a common resource can be defined such that a PDSCH must include at least a first RB in which an extended PDCCH is located. Alternatively, a common resource can be defined such that a PDSCH must include at least a first a few RBs (e.g., in granularity of a RB group as defined in 3GPP specification) in which an extended PDCCH is located. A common resource can also be defined such that a PDSCH must include all of the RBs occupied by the extended PDCCH.

In a system where an RB is exclusively allocated for an extended PDCCH, the neighboring one or several RBs next to the first extended PDCCH RB can be mandated to be included in PDSCH resource.

Figure 4:
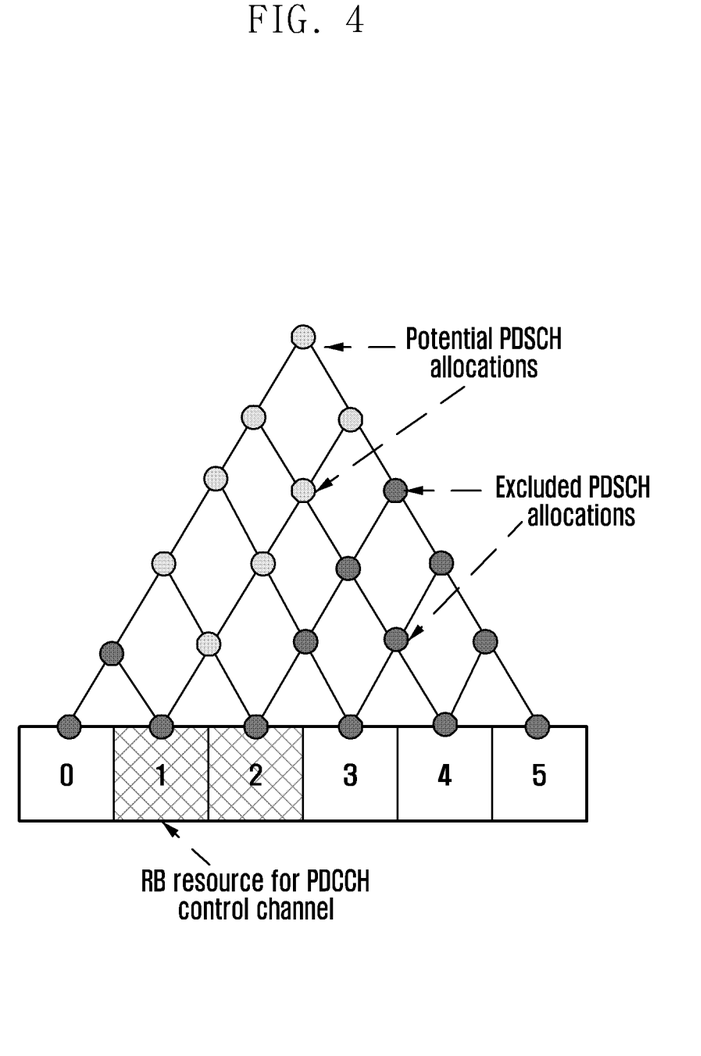
FIG. 4 illustrates resource allocation mandating a PDCCH RB to include a PDSCH resource according to an embodiment of the present invention.

FIG. 4 illustrates resource allocation mandating a PDCCH RB to include a PDSCH resource according to an embodiment of the present invention. Specifically, FIG. 4 illustrates two RBs used for extended PDCCH transmission.

Referring to FIG. 4, in a system where a PDCCH resource is mandated to be a subset of PDSCH transmission, only code points inclusive of the two PDCCH RBs are used for PDSCH resource allocation. These code points exclusive of either of the two PDCCH RBs are not considered for PDSCH resource allocation. The possible code point will be significantly reduced and so be done for the resource allocation field size, accordingly.

In FIG. 4, a size of a resource allocation field size depends on a starting location of a PDCCH. Further, when the UE is attempting blind decoding, the UE will assume different DCI format size for each search space.

Figure 5A:
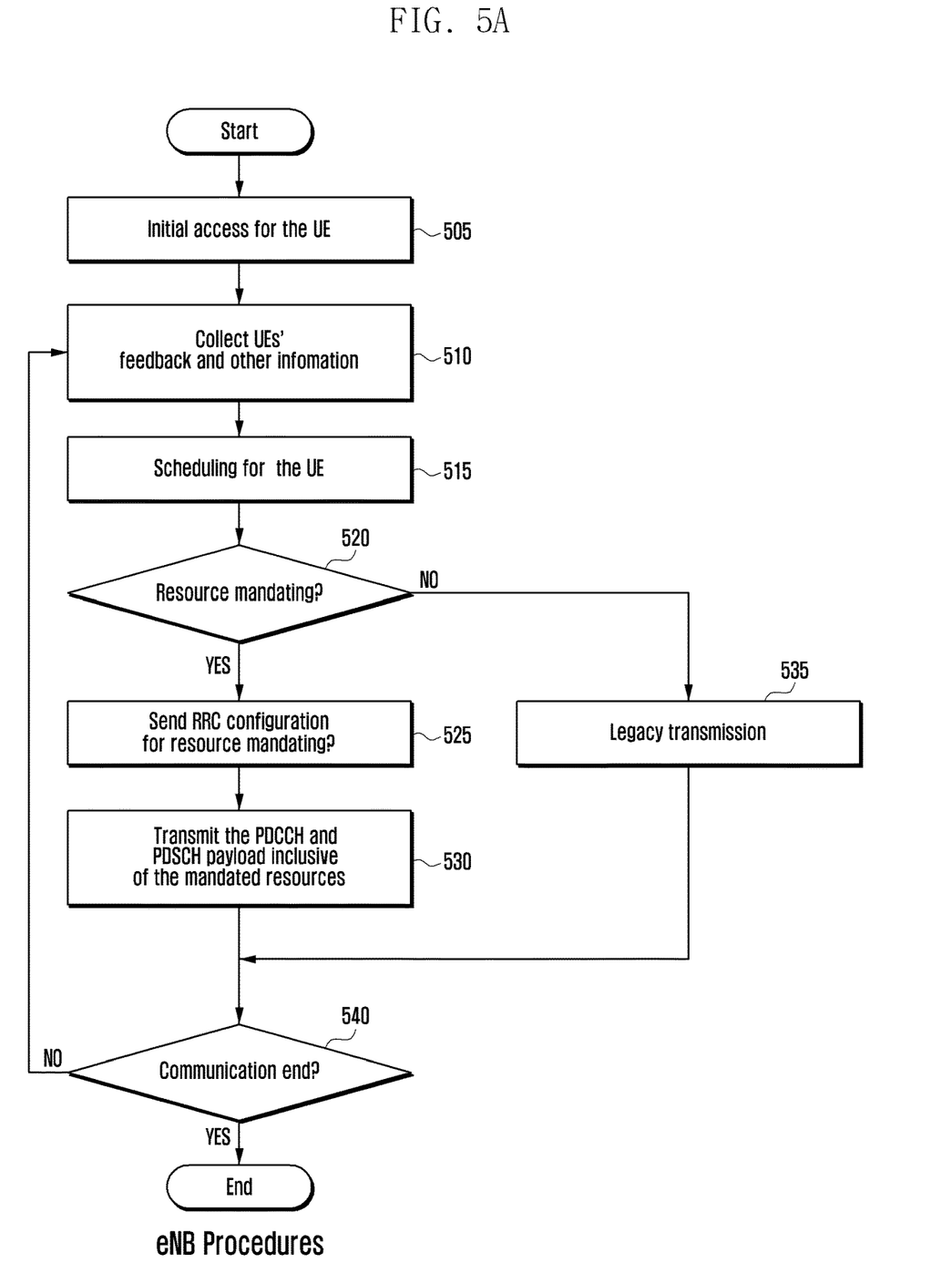
FIG. 5A is a flow chart illustrating an eNB resource allocation mandating method according to an embodiment of the present invention.

FIG. 5A is a flow chart illustrating an eNB resource allocation mandating method according to an embodiment of the present invention.

Referring to FIG. 5, the eNB performs initial access for the UE in step 505. For example, the eNB and UE can set up communication as defined in the legacy systems.

In step 510, the eNB collects UE feedback and other information. Again, the other information may include channel information on a subband, expected traffic of the UE, channel status feedback information, etc.

Based on the collected information, the eNB performs scheduling for the UE in step 515, and determines whether or not resource mandating should be applied to the UE in step 520.

When resource mandating is applied (or modified from a previous mandate), the eNB sends a message to the UE to activate (or update) the resource mandating in step 525. For example, the message may be an RRC message, which includes a short flag indicating whether a resource mandating mode is on or off. Additionally, there can be another independent RRC message restricting the resource to be used by the PDCCH.

In step 530, the eNB transmits PDCCH and PDSCH payloads using the mandated resources.

When resource mandating is not applied in step 520, legacy operations are performed, without sending any configuration to the UE in step 535. Alternatively, to the eNB may indicate all RBs or subbands of the system bandwidth, so that no resource mandating is applied.

In step 540, the eNB determines whether or not communication between the eNB and the UE is finished. If the communication is not finished, the method returns to step 510, where the eNB collects the UE feedback and other information.

Figure 5B:
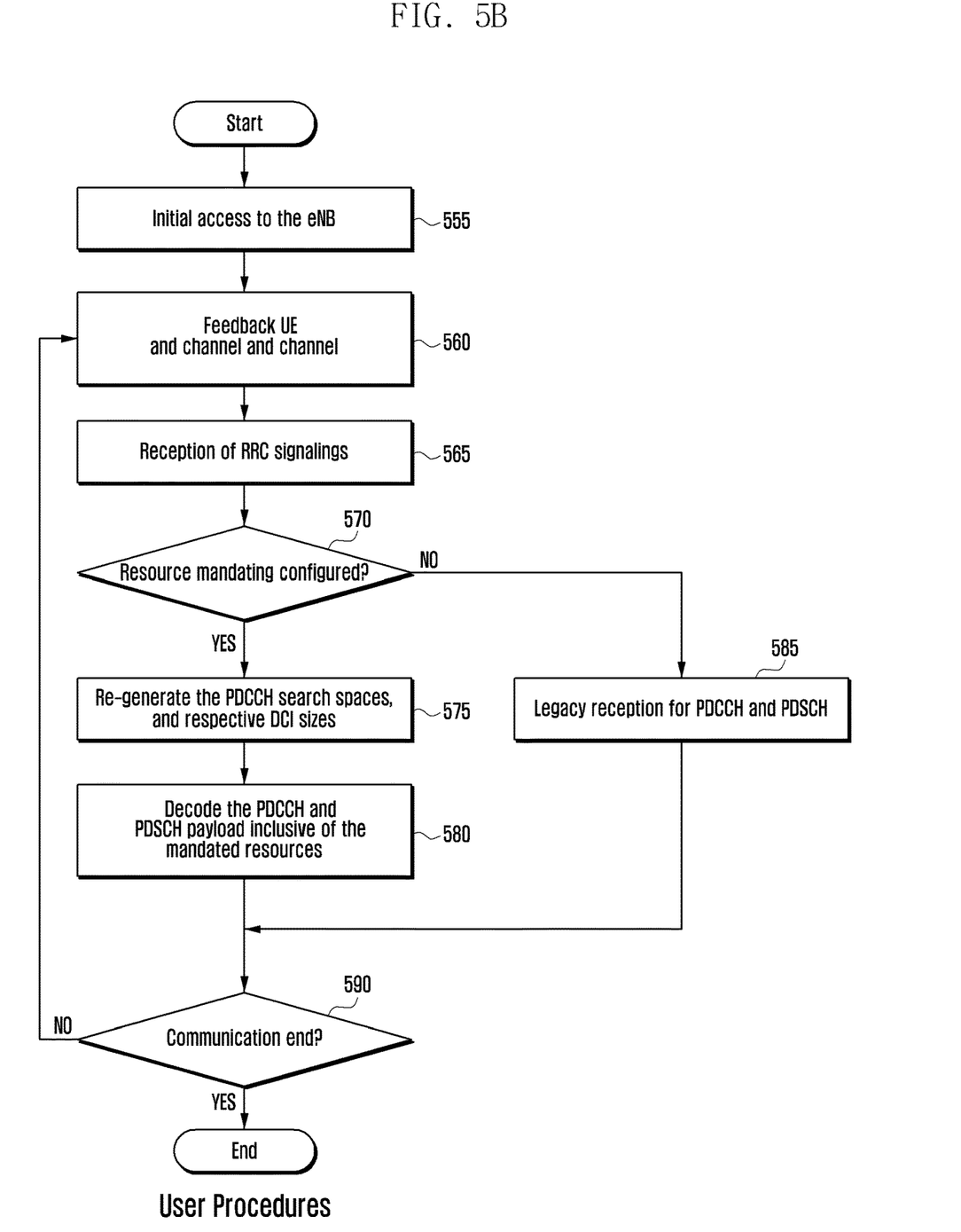
FIG. 5B is a flow chart illustrating a UE resource allocation mandating method according to an embodiment of the present invention.

FIG. 5B is a flow chart illustrating a UE resource allocation mandating method according to an embodiment of the present invention.

Referring to FIG. 5B, the UE performs initial access for the eNB in step 555. For example, the UE and the eNB can set up communication as defined in the legacy systems.

In step 560, the UE transmits feedback of the UE and other information. The other information may include channel information on a subband, expected traffic of the UE, channel status feedback information, etc.

In step 565, the UE receives a message from the eNB. The message may include resource mandating information, i.e., the message may be a RRC message for resource mandating.

In step 570, the UE decodes the received message and determines whether or not resource mandating is applied to the UE.

When resource mandating is applied, the UE assumes that the PDSCH resource allocated to it will be mandated as indicated therein. Accordingly, in step 575, the user regenerates search spaces and respective DCI sizes, based on the message.

In step 580, the UE decodes the PDCCH and PDSCH payload included in the mandated resources. More specifically, the eNB sends both the control and data channels to the UE as scheduled by the RRC signals. After decoding the extended PDCCH, the UE locates its assigned PDSCH resource within an RB subset, and then decodes the data carried therein.

When the UE does not receive resource mandating in step 570, legacy reception is performed for the PDCCH and the PDSCH in step 585. Alternatively, to the eNB may indicate all of the RBs or subbands of the system bandwidth, so that no resource mandating is applied.

In step 590, the UE determines whether or not communication between the UE and the eNB is finished. If the communication is not finished, the method returns to step 560; otherwise, the method ends.

Figure 6:
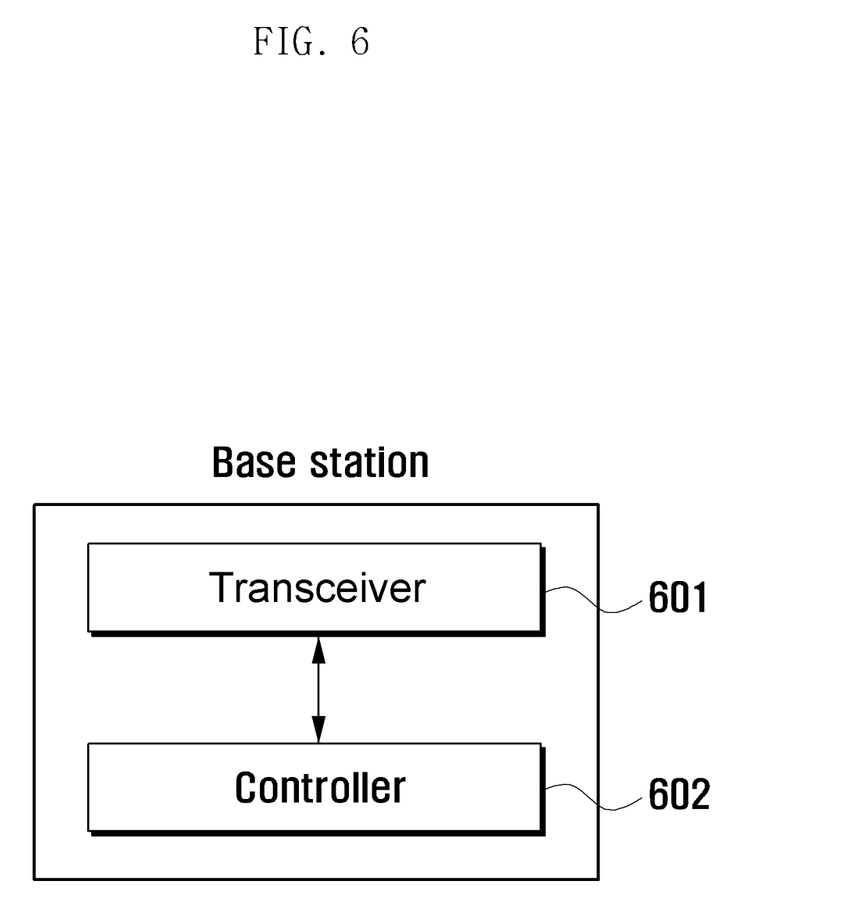
FIG. 6 is a block diagram illustrating a base station according to an embodiment of the present invention.

FIG. 6 is a block diagram illustrating a base station according to an embodiment of the present invention.

Referring to FIG. 6, the base station (or eNB) includes a transceiver 601 and a controller 602. The transceiver 601 transmits and receives signals, e.g., with a UE. The controller 602, e.g., a processor, controls the base station to operate according to the methods described above and illustrated in FIGS. 3A and 5A.

Figure 7:
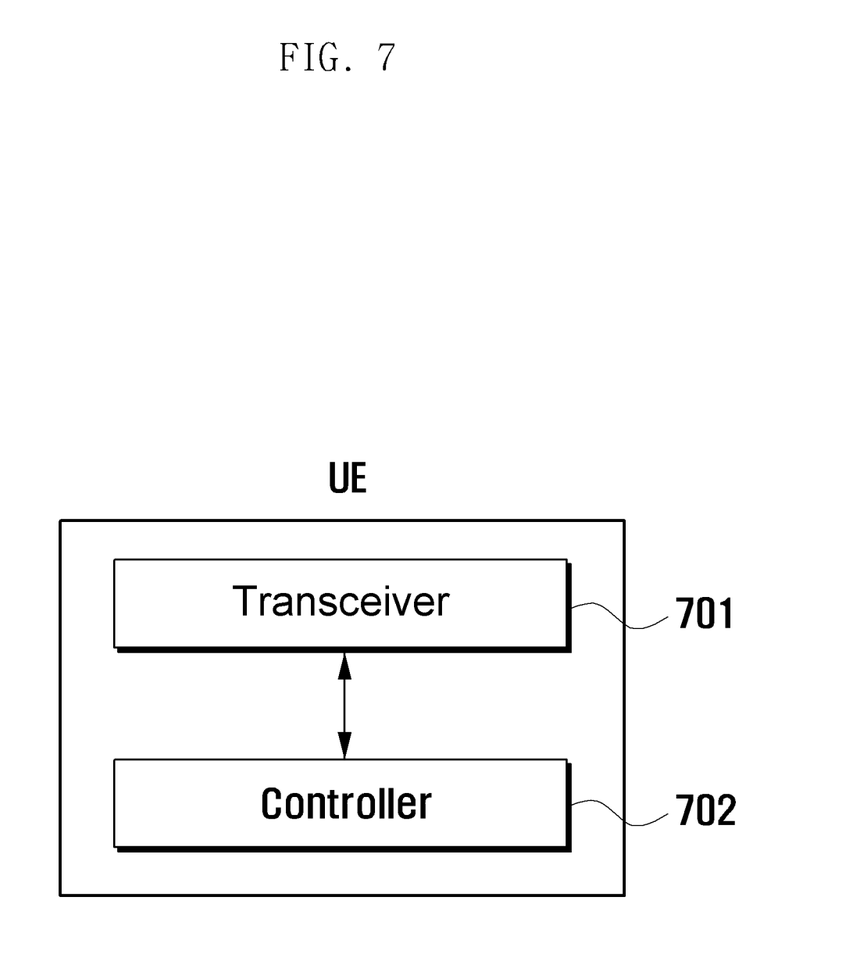
FIG. 7 is a block diagram illustrating a UE according to an embodiment of the present invention.

FIG. 7 is a block diagram illustrating a UE according to an embodiment of the present invention.

Referring to FIG. 7, the UE includes a transceiver 701 and a controller 702. The transceiver 701 transmits and receives signals, e.g., with an eNB. The controller 702, e.g., a processor, controls the UE to operate according to the methods described above and illustrated in FIGS. 3B and 5B.

Although certain embodiments of the present invention have been described in detail hereinabove, it should be clearly understood that many variations and modifications of the basic inventive concepts herein taught, which may appear to those skilled in the present art, will still fall within the spirit and scope of the present invention, as defined in the appended claims and their equivalents.

What is claimed is:

1. A method by a user equipment (UE) in a wireless communication system, the method comprising:
   identifying bit map information on a set of resource blocks associated with a control channel for the UE, through radio resource control (RRC) signaling from a base station;
   receiving, from the base station, control information for downlink data on the control channel identified based on the bit map information; and
   receiving, from the base station, the downlink data on a data channel based on the control information,
   wherein the control information is received on at least one control channel resource, the at least one control channel resource being included in the set of resource blocks, and
   wherein a search space for the control channel of the UE is defined based on an aggregation level, a number of the at least one control channel resource included in the set of resource blocks, and a number of a candidate associated with the control channel.

2. The method of claim 1, wherein the at least one control channel resource is mapped by a distributed or localized method in the set of resource blocks, through the RRC signaling from the base station.

3. The method of claim 1, wherein duration information for receiving the control information is further identified through the RRC signaling from the base station, the duration information being indicated by a number of orthogonal frequency division multiplexing (OFDM) symbols.

4. The method of claim 1, wherein the bit map information is associated with a set of 6 resource blocks.

5. A method by a base station in a wireless communication system, the method comprising:
   identifying bit map information on a set of resource blocks associated with a control channel for a user equipment (UE);
   transmitting, to the UE, the bit map information on radio resource control (RRC) signaling;
   transmitting, to the UE, control information for downlink data on the control channel identified based on the bit map information; and
   transmitting, to the UE, the downlink data on a data channel based on the control information,
   wherein the control information is transmitted on at least one control channel resource, the at least one control channel resource being included in the set of resource blocks, and
   wherein a search space for the control channel of the UE is defined based on an aggregation level, a number of the at least one control channel resource in the set of resource blocks, and a number of a candidate associated with the control channel.

6. The method of claim 5, wherein the at least one control channel resource is mapped by a distributed or localized method in the set of resource blocks, through the RRC signaling from the base station.

7. The method of claim 5, wherein duration information for receiving the control information is further identified through the RRC signaling from the base station, the duration information being indicated by a number of orthogonal frequency division multiplexing (OFDM) symbols.

8. The method of claim 5, wherein the bit map information is associated with a set of 6 resource blocks.

9. A user equipment (UE) in a wireless communication system, the UE comprising:
   a transceiver; and
   a controller coupled with the transceiver and configured to:
      identify bit map information on a set of resource blocks associated with a control channel for the UE, through radio resource control (RRC) signaling from a base station;
      receive, from the base station, via the transceiver, control information for downlink data on the control channel identified based on the bit map information; and
      receive, from the base station, via the transceiver, the downlink data on a data channel based on the control information,
   wherein the control information is received on at least one control channel resource, the at least one control channel resource being included in the set of resource blocks, and
   wherein a search space for the control channel of the UE is defined based on an aggregation level, a number of the at least one control channel resource included in the set of resource blocks, and a number of a candidate associated with the control channel.

10. The UE of claim 9, wherein the at least one control channel resource is mapped by a distributed or localized method in the set of resource blocks, through the RRC signaling from the base station.

11. The UE of claim 9, wherein duration information for receiving the control information is further identified through the RRC signaling from the base station, the duration information being indicated by a number of orthogonal frequency division multiplexing (OFDM) symbols.

12. The UE of claim 9, wherein the bit map information is associated with a set of 6 resource blocks.

13. A base station in a wireless communication system, the base station comprising:
   a transceiver; and
   a controller coupled with the transceiver and configured to:
      identify bit map information on a set of resource blocks associated with a control channel for a user equipment (UE);
      transmit, to the UE, via the transceiver, the bit map information on radio resource control (RRC) signaling;
      transmit, to the UE, via the transceiver, control information for downlink data on the control channel identified based on the bit map information; and
      control the transceiver to transmit, to the UE, the downlink data on a data channel based on the control information,
   wherein the control information is transmitted on at least one control channel resource, the at least one control channel resource being included in the set of resource blocks, and
   wherein a search space for the control channel of the UE is defined based on an aggregation level, a number of the at least one control channel resource in the set of resource blocks, and a number of a candidate associated with the control channel.

14. The base station of claim 13, wherein the at least one control channel resource is mapped by a distributed or localized method in the set of resource blocks, through the RRC signaling from the base station.

15. The base station of claim 13, wherein duration information for receiving the control information is further identified through the RRC signaling from the base station, the duration information being indicated by a number of orthogonal frequency division multiplexing (OFDM) symbols.

16. The base station of claim 13, wherein the bit map information is associated with a set of 6 resource blocks.

17. A method by a user equipment (UE) in a wireless communication system, the method comprising:
identifying information for a subband, through radio resource control (RRC) signaling from a base station, wherein a set of resource blocks (RBs) is included in the subband;
receiving, from the base station, control information for downlink data on a control channel identified based on the information for the subband, wherein at least one RB in the subband is indicated for the downlink data by the control information; and
receiving, from the base station, the downlink data on a data channel based on the at least one RB,
wherein the control information is received on at least one control channel resource, the at least one control channel resource being included in the set of RBs, and
wherein a search space for the control channel of the UE is defined based on an aggregation level, a number of the at least one control channel resource included in the set of RBs, and a number of a candidate associated with the control channel.

18. The method of claim 17, wherein the downlink data is mapped by a distributed or localized method in the set of RBs, through the RRC signaling from the base station.

19. The method of claim 17, wherein information on orthogonal frequency division multiplexing (OFDM) symbols is further identified through the RRC signaling from the base station.

20. A method by a base station in a wireless communication system, the method comprising:
identifying information for a subband, wherein a set of resource blocks (RBs) is included in the subband;
transmitting, to the UE, the information for the subband on radio resource control (RRC) signaling;
transmitting, to the UE, control information for downlink data on a control channel identified based on the information for the subband, wherein at least one RB in the subband is indicated for the downlink data by the control information; and
transmitting, to the UE, the downlink data on a data channel based on the at least one RB,
wherein the control information is transmitted on at least one control channel resource, the at least one control channel resource being included in the set of RBs, and
wherein a search space for the control channel of the UE is defined based on an aggregation level, a number of the at least one control channel resource included in the set of RBs, and a number of a candidate associated with the control channel.

* * * * *